US007937742B2

(12) United States Patent
Jung

(10) Patent No.: US 7,937,742 B2
(45) Date of Patent: May 3, 2011

(54) BROADCASTING RECEIVING APPARATUS AND CONTROL METHOD FOR RECEIVING AUDIO/VIDEO SIGNALS AND ADDITIONAL AUDIO SIGNAL FOR OUTPUTTING TO AN EXTERNAL DEVICE

(75) Inventor: Seok-min Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 553 days.

(21) Appl. No.: 11/872,077

(22) Filed: Oct. 15, 2007

(65) Prior Publication Data

US 2008/0301752 A1 Dec. 4, 2008

(30) Foreign Application Priority Data

Jun. 4, 2007 (KR) ........................ 10-2007-0054589

(51) Int. Cl.
*H04N 7/16* (2006.01)

(52) U.S. Cl. ............. 725/153; 725/59; 348/738; 381/74

(58) Field of Classification Search ........................ None
See application file for complete search history.

(56) References Cited

U.S. PATENT DOCUMENTS 6,807,676 B1 * 10/2004 Robbins et al. ................. 725/39
2006/0236354 A1 * 10/2006 Sutardja ........................ 725/100
2008/0141302 A1 * 6/2008 Ota ................................ 725/34
2008/0263579 A1 * 10/2008 Mears et al. ...................... 725/9

FOREIGN PATENT DOCUMENTS

KR 10-2007-0002970 A 1/2007

* cited by examiner

*Primary Examiner* — Andrew Y Koenig
*Assistant Examiner* — Jason Chung
(74) *Attorney, Agent, or Firm* — Sughrue Mion, PLLC

(57) ABSTRACT

A broadcasting receiving apparatus includes: a signal receiving unit which receives a first signal and a second signal different from the first signal; a signal processing unit which processes the first and second signals; a communication unit which communicates with an external device to output a sound; and a controller which controls the signal processing unit and the communication unit to process a video signal of the first signal to be displayed and to process an audio signal of the second signal to be transmitted to the external device if the first signals contains the video signal and the second signal contains only the audio signal.

19 Claims, 5 Drawing Sheets

BROADCASTING RECEIVING APPARATUS AND CONTROL METHOD FOR RECEIVING AUDIO/VIDEO SIGNALS AND ADDITIONAL AUDIO SIGNAL FOR OUTPUTTING TO AN EXTERNAL DEVICE

CROSS-REFERENCE TO RELATED PATENT APPLICATION

This application claims priority from Korean Patent Application No. 10-2007-0054589, filed on Jun. 4, 2007 in the Korean Intellectual Property Office, the disclosure of which is incorporated herein by reference.

BACKGROUND OF THE INVENTION

1. Field of the Invention

Apparatuses and methods consistent with the present invention relate to processing broadcast contents including only audio signals, more particularly, to processing and transmitting broadcast contents including audio/video signals and broadcast contents including only audio signals.

2. Description of the Related Art

In general, a broadcasting receiving apparatus such as a television (TV) set, a set top box, etc. is referred to as a video display terminal which receives broadcasting channel signals transmitted from a plurality of broadcasting stations, and displays the broadcasting channel signals by image data. As a broadcasting channel signal also includes a cable broadcasting signal and a satellite broadcasting signal, users may watch a wide variety of broadcasts in addition to ground-wave broadcasts. As broadcast contents are diversified, contents for music broadcasting which provide only audio signals without video signals increase.

However, it is not easy for the users to access to contents providing only audio signals with a broadcasting receiving apparatus such as a TV set which receives mainly video signals.

As a related art broadcasting receiving apparatus such as a TV set or a set top box includes an internal/external speaker or a wired/wireless headset, it is capable of processing and outputting an audio signal of broadcasting contents as a sound. However, the broadcasting receiving apparatus primarily outputs a sound corresponding to a current main screen being displayed, and thus options for various contents including a content containing only audio signal and another content are limited.

SUMMARY OF THE INVENTION

The present invention provides a broadcasting receiving apparatus which searches and stores channels including only audio signals, such as music broadcasting, for sound not corresponding to a main screen so as to output the audio signals to an external device such as earphones connected to a TV set or a Bluetooth headphone, and a control method thereof.

The present invention also provides a broadcasting receiving apparatus that enables a user to receive audio signals for sound associated with video signals being displayed on a TV main screen, and another user to receive different audio signals for sound not associated with the video signals of the TV main screen at the same time, and a control method thereof.

Aspects of the present invention will be set forth in part in the description which follows and, in part, will be obvious from the description, or may be learned by practice of the present invention.

According to an aspect of the present invention, there is provided a broadcasting receiving apparatus including: a signal receiving unit which receives a first broadcast signal and a second broadcast signal; a signal processing unit which processes the first broadcast signal and the second broadcast signal; a communication unit which communicates with an external device to output the second broadcast signal; and a controller which controls the signal processing unit to process the first signal to be output, and controls the signal processing unit and the communication unit to process the second broadcast signal to be transmitted to the external device, if the first broadcast signal comprises a video signal and the second broadcast signal includes only an audio signal.

According to an aspect of the invention, the signal processing unit includes a first signal processor which processes the first broadcast signal and a second signal processor which processes the second broadcast signal.

According to an aspect of the invention, the communication unit includes a Bluetooth module.

According to an aspect of the invention, the respective broadcast signal corresponds to one of a plurality of channels, the broadcasting receiving apparatus further includes an input unit which is input with a command from a user, the controller controls the signal processing unit and the communication unit to transmit the audio signal of the second broadcast signal corresponding to one of the channels selected by a command input by the user through the input unit to the external device.

According to an aspect of the invention, the broadcasting receiving apparatus further includes a storage unit which stores information on a channel of the second broadcast signal which includes only the audio signal.

According to an aspect of the invention, the controller controls the signal processing unit and the communication unit to transmit the audio signal of the second broadcast signal corresponding to one of the channels selected by the command input by the user through the input unit with reference to the information on the channel stored in the storage unit to the external device.

According to an aspect of the invention, the controller controls the signal processing unit and the communication unit to transmit the audio signal of the second broadcast signal corresponding to one of channels selected by a command input by a user to the external device if the command of the user is input from the external device through the communication unit.

According to an aspect of the invention, the broadcasting receiving apparatus further includes a display, wherein the controller controls the signal processing unit to generate a selection screen where the user inputs a command and to display it on the display.

According to an aspect of the invention, the broadcasting receiving apparatus further includes a display, wherein the controller controls the signal processing unit and the communication unit to process the video signal of the first broadcast signal to be displayed on the display and to process the audio signal of the second broadcast signal to be transmitted to the external device if the first broadcast signal includes the video signal and the second broadcast signal includes only the audio signal.

According to an aspect of the present invention, there is provided a control method of a broadcasting receiving apparatus including: receiving a first broadcast signal and a second broadcast signal; processing and outputting the first broadcast signal, and processing and transmitting the second broadcast signal to an external device, if the first broadcast signal comprises a video signal, and the second broadcast signal includes only an audio signal.

According to an aspect of the invention, the processing the audio signal of the second broadcast signal includes transmitting the audio signal to the external device through a Bluetooth module.

According to an aspect of the invention, the respective broadcast signal corresponds to one of a plurality of channels, the control method further including receiving a command from a user and transmitting the audio signal of the second broadcast signal corresponding to one of the channel selected by the command from the user to the external device.

According to an aspect of the invention, the control method further includes storing information on a channel of the second broadcast signal which includes only the audio signal.

According to an aspect of the invention, the processing the audio signal of the other of the broadcast signals includes transmitting the audio signal of the second broadcast signal corresponding to a channel selected by a command from a user with reference to the stored information on the channel to the external device.

According to an aspect of the invention, the control method further includes receiving a command of a user from the external device, and transmitting the audio signal of the second broadcast signal corresponding to one channel selected by the command of the user to the external device.

According to an aspect of the invention, the control method further includes generating a selection screen where a user inputs a command, and transmitting the audio signal of the second broadcast signal corresponding to one channel selected by the command of the user to be transmitted to the external device.

According to an aspect of the invention, the generating the selection screen includes displaying the selection screen on a display.

According to an aspect of the invention, the receiving the broadcast signals includes receiving the first broadcast signal which includes the video signal and the second broadcast signal which includes only the audio signal, and processing the video signal of the first broadcast signal to be displayed on a display and processing the audio signal of the second broadcast signal to be transmitted to the external device.

BRIEF DESCRIPTION OF THE DRAWINGS

The above and/or other aspects of the present invention will become apparent and more readily appreciated from the following detailed description of the exemplary embodiments, taken in conjunction with the accompanying drawings, in which.

DETAILED DESCRIPTION OF EXEMPLARY EMBODIMENTS

Figure 1:
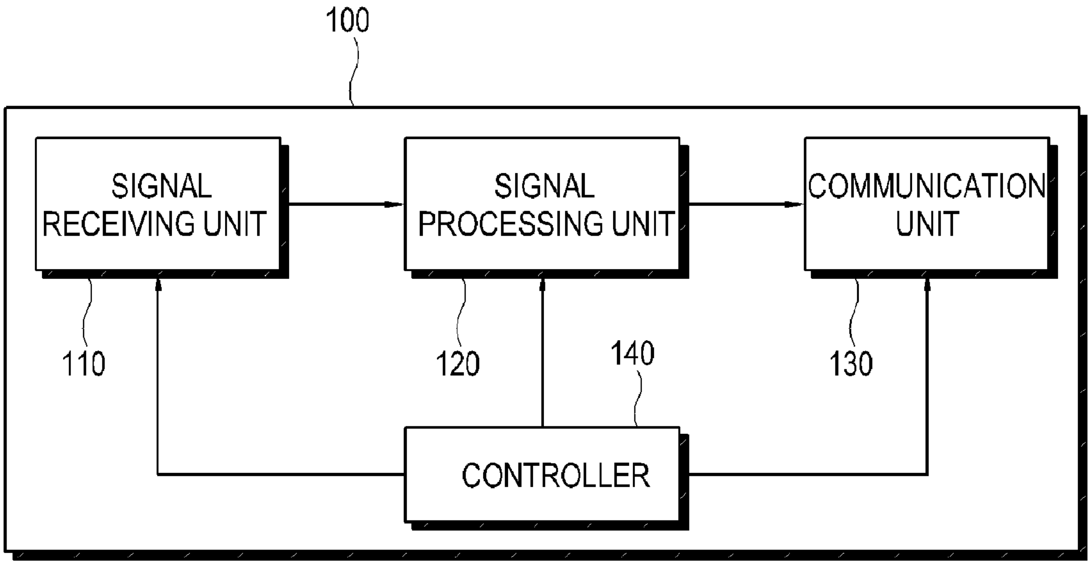
FIG. 1 is a control block diagram of a broadcasting receiving apparatus according to an exemplary embodiment of the present invention.

Reference will now be made in detail to exemplary embodiments of the present invention, examples of which are illustrated in the accompanying drawings, wherein like reference numerals refer to like elements throughout. The exemplary embodiments are described below so as to explain the present invention by referring to the figures.

The present invention is applicable to a broadcasting receiving apparatus such as a set top box, a digital TV, etc. which is capable of receiving broadcasting. Referring to FIG. 1, a broadcasting receiving apparatus 100 includes a signal receiving unit 110, a signal processing unit 120, a communication unit 130 and a controller 140 to control the foregoing components.

The signal receiving unit 110 receives signals from the outside and may be provided as a tuner (not shown) and an audio/video (A/V) receiver (not shown).

The tuner tunes a broadcast signal received via an antenna to one of broadcast channels. The tuner converts the tuned broadcast signal to an intermediate frequency signal, demodulates the converted signal, corrects an error from the demodulated signal, and then restores the broadcast signal to a transport stream. Then, the tuner transmits the broadcast signal to the signal processing unit 120.

The A/V receiver receives video and audio signals from a video player, e.g., a camcorder, a digital versatile disk (DVD) player, etc., and transmits the signals to the signal processing unit 120.

The signal processing unit 120 includes a demultiplexer (not shown) to separate the video and audio signals transmitted from the signal receiving unit 110, a video signal processor (not shown) to process the video signal, and an audio signal processor (not shown) to process the audio signal.

The video signal processor performs a decoding process to extract information on an image encoded in a video signal, and outputs the extracted image information to be visible on a display to a user.

The audio signal processor decodes the audio signal extracted by the demultiplexer, processes it to be audible to the user through a speaker, and transmits it to the communication unit 130. Here, the audio signal processor includes a first audio signal processor (not shown) and a second audio signal processor (not shown). The second audio signal processor may decode a broadcast signal which includes only an audio signal while the first signal processor process an audio signal of a broadcast signal which includes both video and audio signals.

The communication unit 130 communicates with an external device to output the audio signal transmitted from the audio signal processor. Here, the external device for the audio signal output may be provided as a speaker, a head phone and a Bluetooth headset.

The communication unit 130 according to the present exemplary embodiment includes a Bluetooth module which communicates with a Bluetooth headset.

The Bluetooth module converts the audio signal decoded in the audio signal processor into a high-frequency signal and transmits it through a transmitting antenna. Here, as Bluetooth uses a frequency of 2.4 GHz, the Bluetooth module converts the decoded audio signal according to a Bluetooth communication protocol into a signal with a frequency of 2.4 GHz and transmits the signal.

The controller 140 controls the signal processing unit 120 to decode the audio signal of the broadcast signal received through the signal receiving unit 110 and to transmit the decoded signal to the communication unit 130.

For example, if a broadcast signal which includes only an audio signal such as music broadcasting is received through the signal receiving unit 110, the controller 140 controls the signal processing unit 120 and the communication unit 130 to process the broadcast signal and to transmit it to an external Bluetooth headset through the Bluetooth module.

Figure 2:
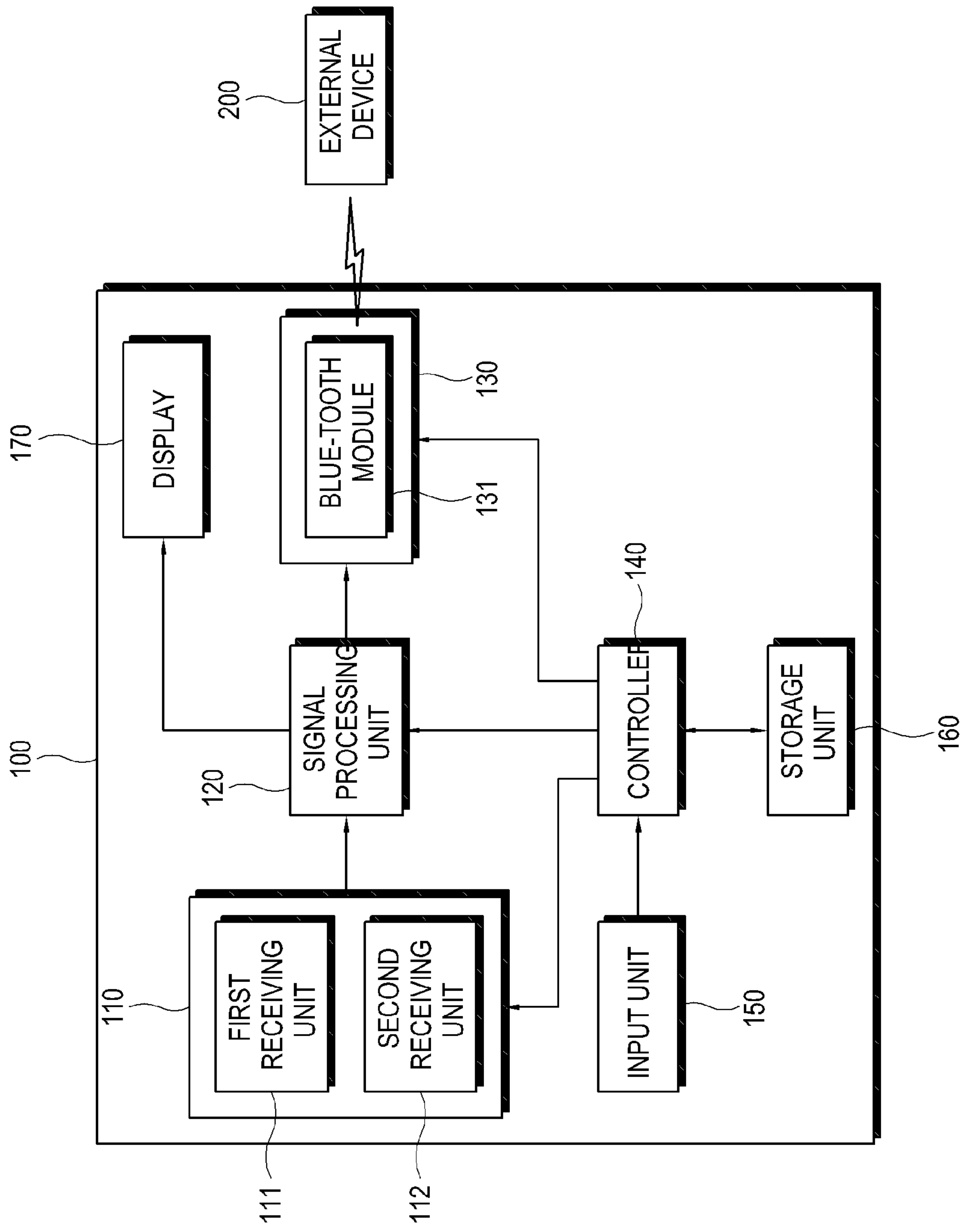
FIG. 2 is a control block diagram of a broadcasting receiving apparatus according to another exemplary embodiment of the present invention.

Referring to FIG. 2, the broadcasting receiving apparatus 100 may further include an input unit 150, a storage unit 160 and a display 170.

If a command is input by a user through the input unit 150, the controller 140 controls the signal processing unit 120 and the communication unit 130 to process a broadcast signal which includes only an audio signal among received broadcast signals and to output it according to the command.

For example, if a user inputs a command to output an audio signal through the input unit 150 which is provided as a button on the broadcasting receiving apparatus 100, a remote controller, etc., the controller 140 controls the signal processing unit 120 and the communication unit 130 to process a broadcast signal which includes only an audio signal among broadcast signals received through the signal receiving unit 110 and to output the processed audio signal.

Here, the signal receiving unit 110 according to an exemplary embodiment of the present invention includes a first receiving unit 111 and a second receiving unit 112.

For example, a user selects a channel corresponding to a TV broadcast signal which the user wants to watch through the input unit 150. Then, the controller 140 inputs a control signal to the first receiving unit 111 according to the selection of the channel. The first receiving unit 111 selects the channel signal, which is set up by the user, among a plurality of TV broadcast channel signals input via an antenna, and separates the selected channel signal into audio and video signals to be transmitted, respectively.

Figure 3:
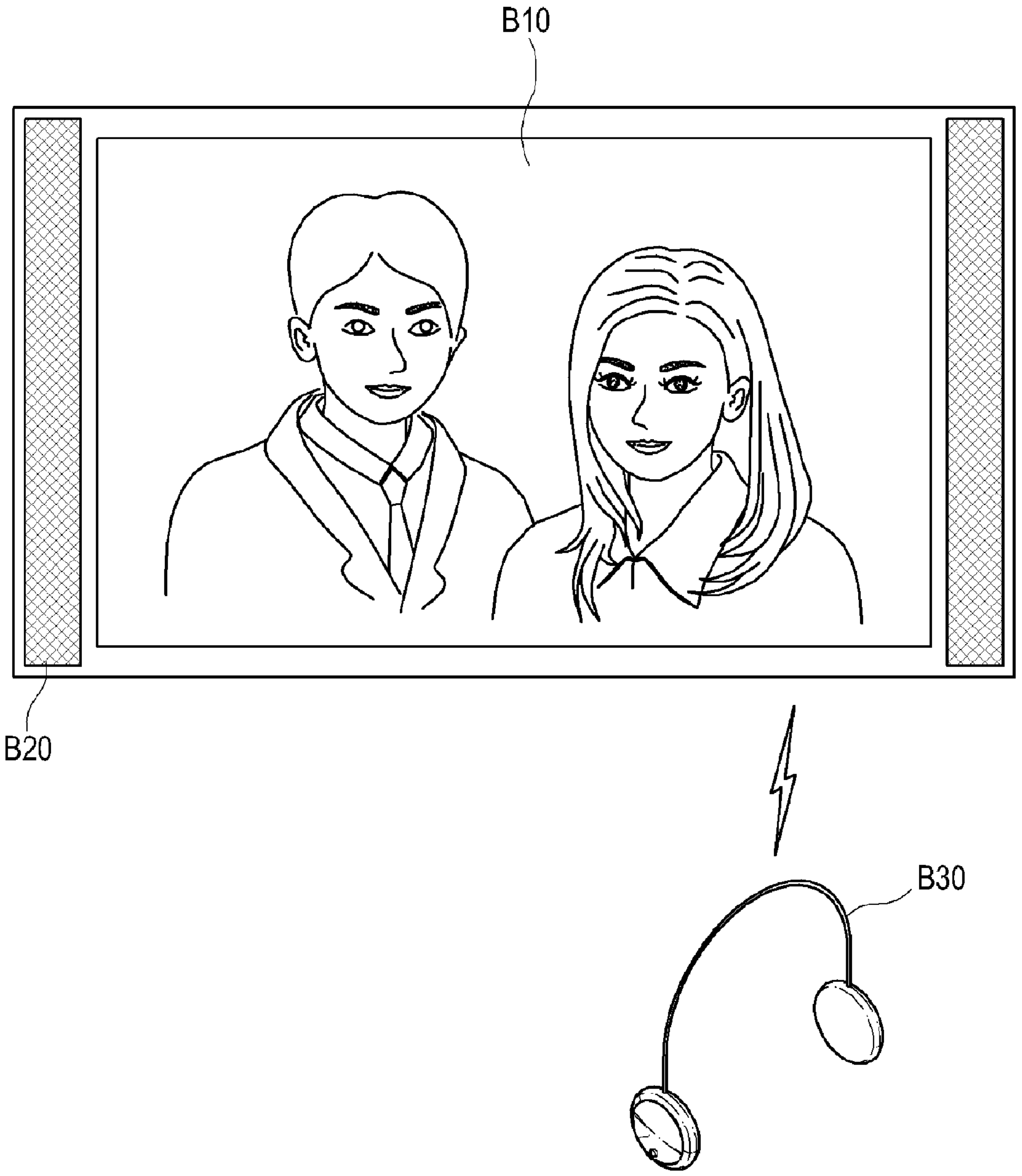
FIG. 3 illustrates the broadcasting receiving apparatus according to the exemplary embodiment of the present invention.
Figure 4:
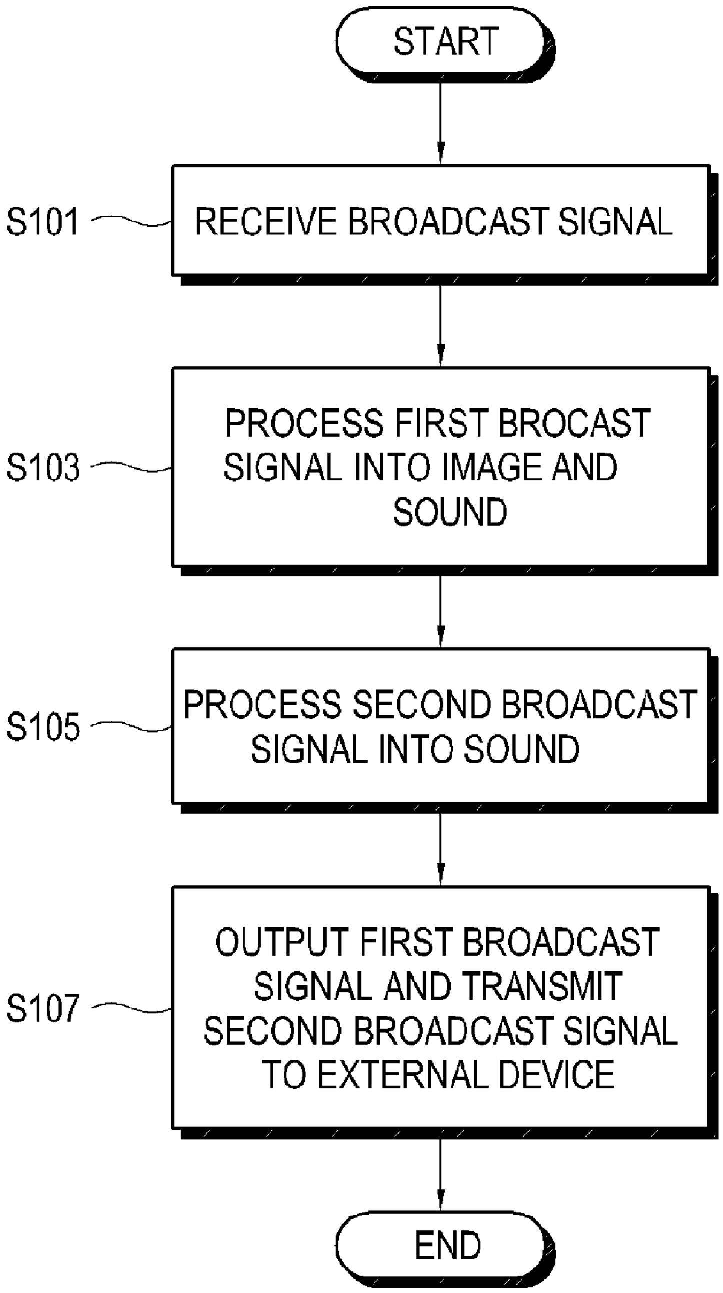
FIG. 4 is a flow chart of the broadcasting receiving apparatus according to an exemplary embodiment of the present invention.
Figure 5:
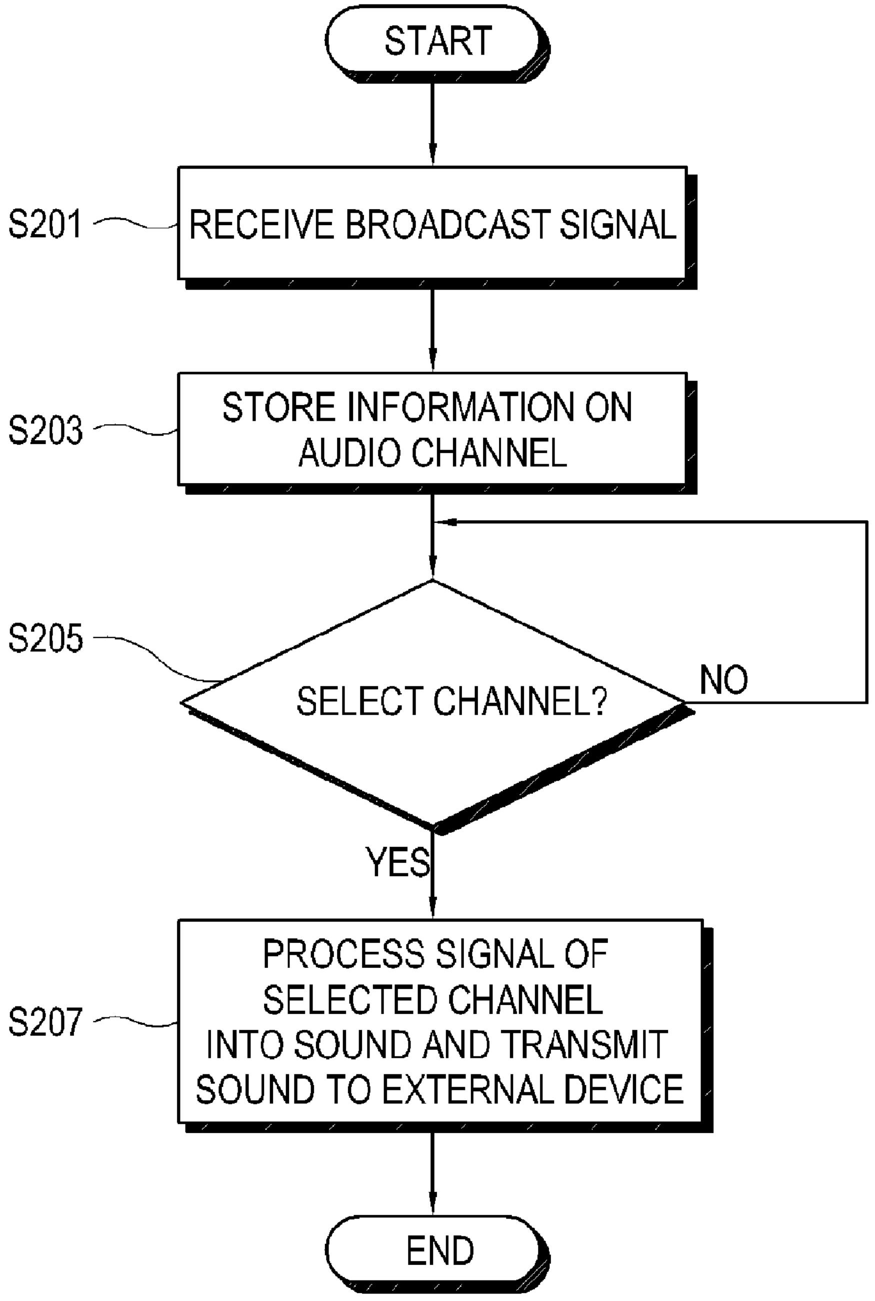
FIG. 5 is a flow chart of a broadcasting receiving apparatus according to another exemplary embodiment of the present invention.

The audio signal of the TV broadcast signals received by the first receiving unit 111 is demodulated to be applied to the audio signal processor (not shown). Here, the audio signal processor processes the audio signal to have an audible frequency, and applies it to a speaker so that a sound of the selected channel is output through the speaker B20, as shown in FIG. 3.

The video signal of the TV broadcast signals received by the first receiving unit 111 is applied to the video signal processor (not shown). Here, the video signal processor processes and applies the video signal to be displayable on the display. Then, as shown in FIG. 3, an image of the selected channel is output through the display B10.

Here, if another user selects an output of an audio signal through the input unit 150, the controller 140 selects a channel signal which includes only an audio signal through the second receiving unit 112, and controls the signal processing unit 120 and the communication unit 130 to process and output the audio signal of the selected channel.

The controller 140 may control the signal processing unit 120 to generate a selection screen and to display it on the display 170 so that the user selects an output of an audio signal.

The storage unit 160 may store information on a channel of a broadcast signal, which includes only an audio signal, as a channel list. Accordingly, if the user selects an output of an audio signal while a broadcast signal displayed on the main screen is received through the first receiving unit 111, the controller 140 controls the second receiving unit 112 to select one of channels stored in the storage unit 160.

The controller 140 may receive a command to output an audio signal through the communication unit 130. In another exemplary embodiment of the present invention, if a user inputs a command to change a channel of an audio signal or to output an audio signal through the Bluetooth module 131, the controller 140 controls the second receiving unit 112 to select one channel on the basis of the channel list stored in the storage unit 160, and the signal processing unit 120 and the communication unit 130 to process and output the input audio signal to the Bluetooth module 131.

Here, referring to FIG. 3, an audio signal selected by a user through the communication unit 130 may be transmitted to the Bluetooth headset through the Bluetooth module (B30).

Hereinafter, an operation of the broadcasting receiving apparatus 100 according to the present exemplary embodiment will be explained with reference to drawings.

First, a broadcast signal is received through the signal receiving unit 110 (S101). Here, the controller 140 controls the first signal processor to process a first broadcast signal which includes a video signal and an audio signal (S103), and the second signal processor to process a second broadcast signal which includes only an audio signal (S105).

The controller 140 controls to output an image and a sound of the first broadcast signal and transmits an audio signal of the second broadcast signal to the external device 200 through the communication unit 130 as a sound (S107) at the same time.

For example, the controller 140 controls the communication unit 130 to transmit a signal which includes only an audio signal to the external apparatus 200, e.g., the Bluetooth headset, while outputting another audio signal corresponding to a video signal, which is displayed on the display 170 of the broadcasting receiving apparatus 100, to the speaker or the like as a sound.

In an exemplary embodiment of the present invention, a broadcast signal is received by the signal receiving unit 110 (S201).

Here, the controller 140 controls the storage unit 160 to store information on an audio channel, which includes only an audio signal among the received broadcast signals, as a channel list (S203).

If a signal to select an audio channel is input through the input unit 150 and the communication unit 130 (S205), the controller 140 controls the signal receiving unit 110 to select an audio channel on the basis of the channel list stored in the storage unit 160, and the signal processing unit 120 and the communication unit 130 to process a broadcast signal of the received channel into a sound and to transmit it to the external apparatus 200 (S207).

Here, the communication unit may be realized as a Bluetooth module 131. The user may input signals to select and change an audio channel through the Bluetooth module 131 from the outside, separately from a broadcast channel which is received by the first receiving unit 111 and displayed on the display 170, and may receive a sound of the audio channel through the Bluetooth headset.

As described above, the exemplary embodiments of the present invention provide a broadcasting receiving apparatus which searches, stores and manages channels which transmit only audio signals such as music broadcasting but do not transmit combined audio and video signals to constitute a main screen of the broadcasting receiving apparatus so as to output the audio signals to an external device such as earphones connected to the broadcasting receiving apparatus or a Bluetooth headphone, and a control method thereof.

Further, the present invention also provides a broadcasting receiving apparatus that allows a user to receive one type of contents while another user is receiving another type of contents through a main screen of the broadcasting receiving apparatus, and a control method thereof.

Thus, a user may listen to audio contents without an additional device to play a sound and select the audio contents using Bluetooth or the like from a long distance.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A broadcasting receiving apparatus comprising:
- a signal receiving unit which receives a first signal and a second signal;
- a signal processing unit which processes the first signal and the second signal;
- a communication unit which communicates with an external device to output the second signal;
- a storage unit which stores information on a second channel; and
- a controller which controls the signal processing unit to process the first signal to be output, and controls the signal processing unit and the communication unit to process the second signal to be transmitted to the external device, if the first signal includes a video signal and the second signal includes only an audio signal,
- wherein if a command for selecting the second channel corresponding to the second signal is input directly through the communication unit, the controller controls the signal processing unit and the communication unit to process the second signal to be transmitted to the external device through the communication unit,
- wherein the second signal is provided through the second channel.

2. The broadcasting receiving apparatus according to claim 1, wherein the controller controls the signal processing unit and the communication unit so that the second signal is transmitted to the external device when the first signal is being output.

3. The broadcasting receiving apparatus according to claim 1, further comprising a display and a speaker,
- wherein the first signal further includes an audio signal associated with the video signal, and
- wherein the video signal is displayed on the display and the audio signal associated with the video signal is output through the speaker.

4. The broadcasting receiving apparatus according to claim 1, wherein the signal processing unit comprises a first signal processor which processes the first signal and a second signal processor which processes the second signal.

5. The broadcasting receiving apparatus according to claim 1, wherein the communication unit comprises a Bluetooth module.

6. The broadcasting receiving apparatus according to claim 1, further comprising an input unit through which a command from a user is input,
- wherein by the command from the user, the second channel corresponding to the second signal is selected for the signal receiving unit to receive the second signal, and the controller controls the signal processing unit and the communication unit to process the second signal to be transmitted to the external device.

7. The broadcasting receiving apparatus according to claim 6, further comprising a display,
- wherein the controller controls the signal processing unit to generate a selection screen on the display,
- wherein the selection screen indicates that the second channel corresponds to the second signal, and
- wherein the selection screen allows the user to input the command to select the second channel to receive the second signal.

8. The broadcasting receiving apparatus according to claim 6, wherein the second channel is selected by the command from the user with reference to the information on the second channel stored in the storage unit.

9. The broadcasting receiving apparatus according to claim 1,
- wherein the signal receiving unit comprises a first receiving unit which receives the first signal, and a second receiving unit which receives the second signal,
- wherein in response to an input command, the controller controls the first receiving unit to select a first channel to receive the first signal, or the second receiving unit to select the second channel to receive the second signal.

10. The broadcasting receiving apparatus according to claim 1, wherein the first and second signals are broadcast signals.

11. A control method of a broadcasting receiving apparatus comprising:
- receiving a first signal and a second signal;
- storing information on a second channel;
- processing and outputting the first signal, and processing and transmitting the second signal to an external device, if the first signal includes a video signal, and the second signal includes only an audio signal;
- wherein if a command for selecting the second channel corresponding to the second signal is input directly through a communication unit, the processing and transmitting the second signal includes processing the second signal to be transmitted to the external device through the communication unit,
- wherein the second signal is provided through the second channel.

12. The control method according to claim 11, wherein the processing and transmitting the second signal to the external device is performed when the first signal is being output.

13. The control method according to claim 11,
- wherein the first signal further comprises an audio signal associated with the video signal, and
- wherein the video signal is displayed in a display of the broadcasting receiving apparatus, and the audio signal associated with the video signal is output through a speaker of the broadcasting receiving apparatus.

14. The control method according to claim 11, wherein the second signal is transmitted to the external device through a Bluetooth module.

15. The control method according to claim 11, further comprising receiving a command from a user, wherein the second channel corresponding to the second signal is selected by the command from the user to receive the second signal, and the second signal is processed and transmitted to the external device.

16. The control method according to claim 15, further comprising generating a selection screen on a display of the broadcasting receiving apparatus,
- wherein the selection screen indicates that the second channel corresponds to the second signal, and
- wherein the selection screen allows the user to input the command to select the second channel to receive the second signal.

17. The control method according to claim 16, wherein the generating the selection screen comprises displaying the selection screen on a display.

18. The control method according to claim 17, wherein the second channel is selected by the command from the user with reference to the stored information on the second channel.

19. The control method according to claim 11, wherein the first and second signals are broadcast signals.

* * * * *